United States Patent [19]
Locke

[11] 3,953,859
[45] Apr. 27, 1976

[54] METHOD AND APPARATUS FOR RECORDING LATENT PHOTOGRAPHIC IMAGES

[75] Inventor: John W. Locke, Toronto, Canada

[73] Assignee: The Governing Council of the University of Toronto, Downsview, Canada

[22] Filed: Oct. 25, 1974

[21] Appl. No.: 517,959

[52] U.S. Cl. .................. 346/1; 346/76 L; 346/108; 178/6.6 R; 178/6.7 R; 178/7.4; 178/7.6; 178/15

[51] Int. Cl.² .......................... G01D 9/42

[58] Field of Search .......... 346/1, 76 L, 108; 178/6.6 R, 6.7 R, 7.4, 7.6, 7.7, 15; 219/121 L, 121 LM

[56] References Cited
UNITED STATES PATENTS

| | | | |
|---|---|---|---|
| 3,368,209 | 2/1968 | McGlauchlin et al. | 346/76 L X |
| 3,441,949 | 4/1969 | Rolon | 346/108 |
| 3,534,166 | 10/1970 | Korpel | 178/6.7 |
| 3,622,742 | 11/1971 | Cohen et al. | 219/121 L |
| 3,654,624 | 4/1972 | Becker et al. | 346/76 L X |
| 3,657,707 | 4/1972 | McFarland et al. | 346/76 L X |
| 3,703,724 | 11/1972 | Thomas | 346/108 |
| 3,721,991 | 3/1973 | Kaufman et al. | 346/108 |
| 3,751,587 | 8/1973 | Insler et al. | 178/6.6 R |
| 3,787,888 | 1/1974 | Haskel | 346/108 |
| 3,809,806 | 5/1974 | Walker et al. | 178/7.6 |
| 3,836,709 | 9/1974 | Hutchison | 178/6.7 R |
| 3,848,087 | 11/1974 | Carrell | 178/7.6 |
| 3,874,621 | 4/1975 | Blair et al. | 346/108 |

*Primary Examiner*—L. T. Hix
*Assistant Examiner*—Stanley J. Witkowski

[57] ABSTRACT

The invention provides a method of and apparatus for recording latent photographic images on film by scanning the film in a raster pattern with a spot produced by focusing onto the film a beam of radiation, for example a laser beam, which is modulated in accordance with the retrieval of pictorial data defining an image to be recorded, the data comprising a plurality of elemental data each defining a required spot intensity at a respective elemental image area and a plurality of corrective data defining geometrical distortions of the image to be recorded. Clock signals are produced in accordance with the traverse of the spot, and the elemental data are retrieved in accordance with the production of the clock pulses the production of the clock signals being modified in accordance with the corrective data so as to determine the retrieval of the elemental data so as to set the spot intensity at the required level for each elemental image area as modified by the corrective data. The apparatus may be used in a scanning mode to generate pictorial data from the scanning of an image.

11 Claims, 14 Drawing Figures

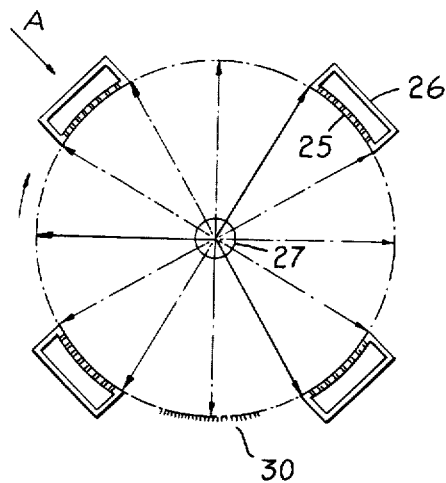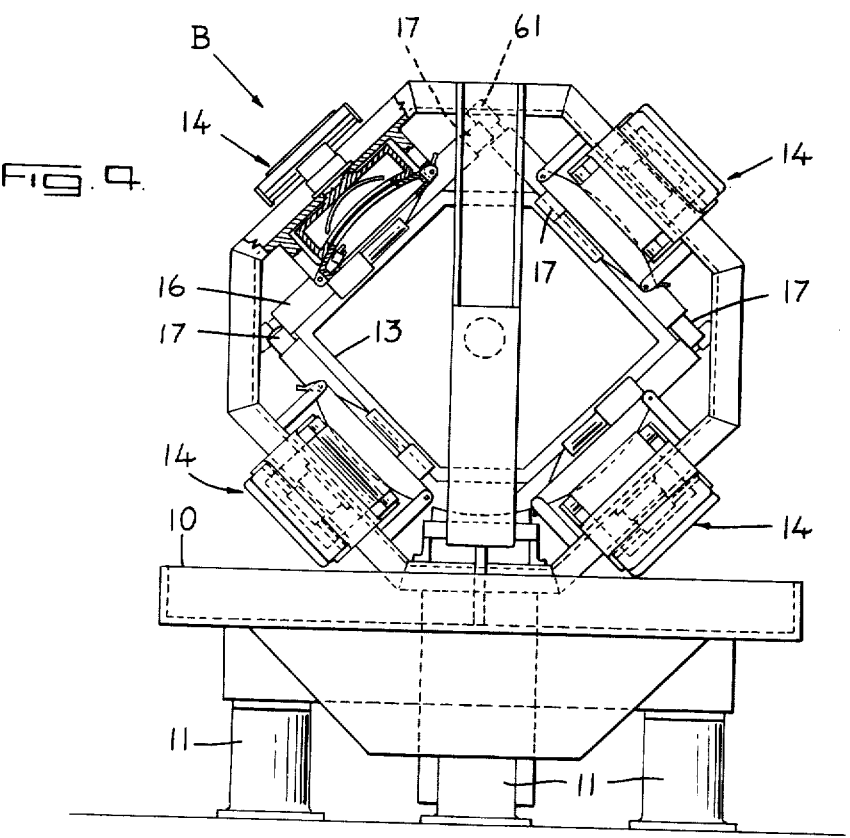

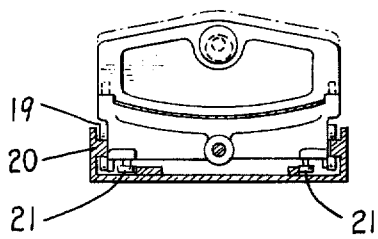
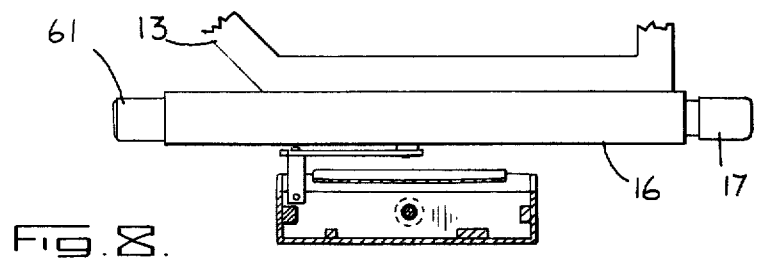
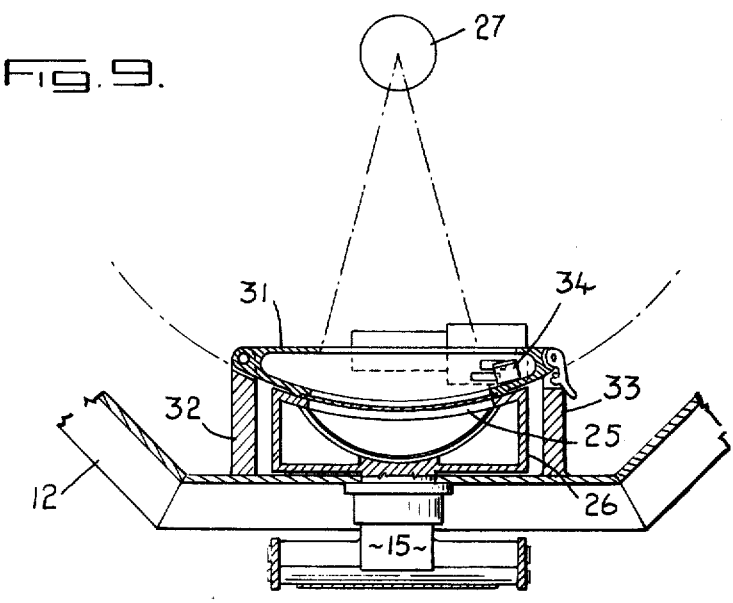

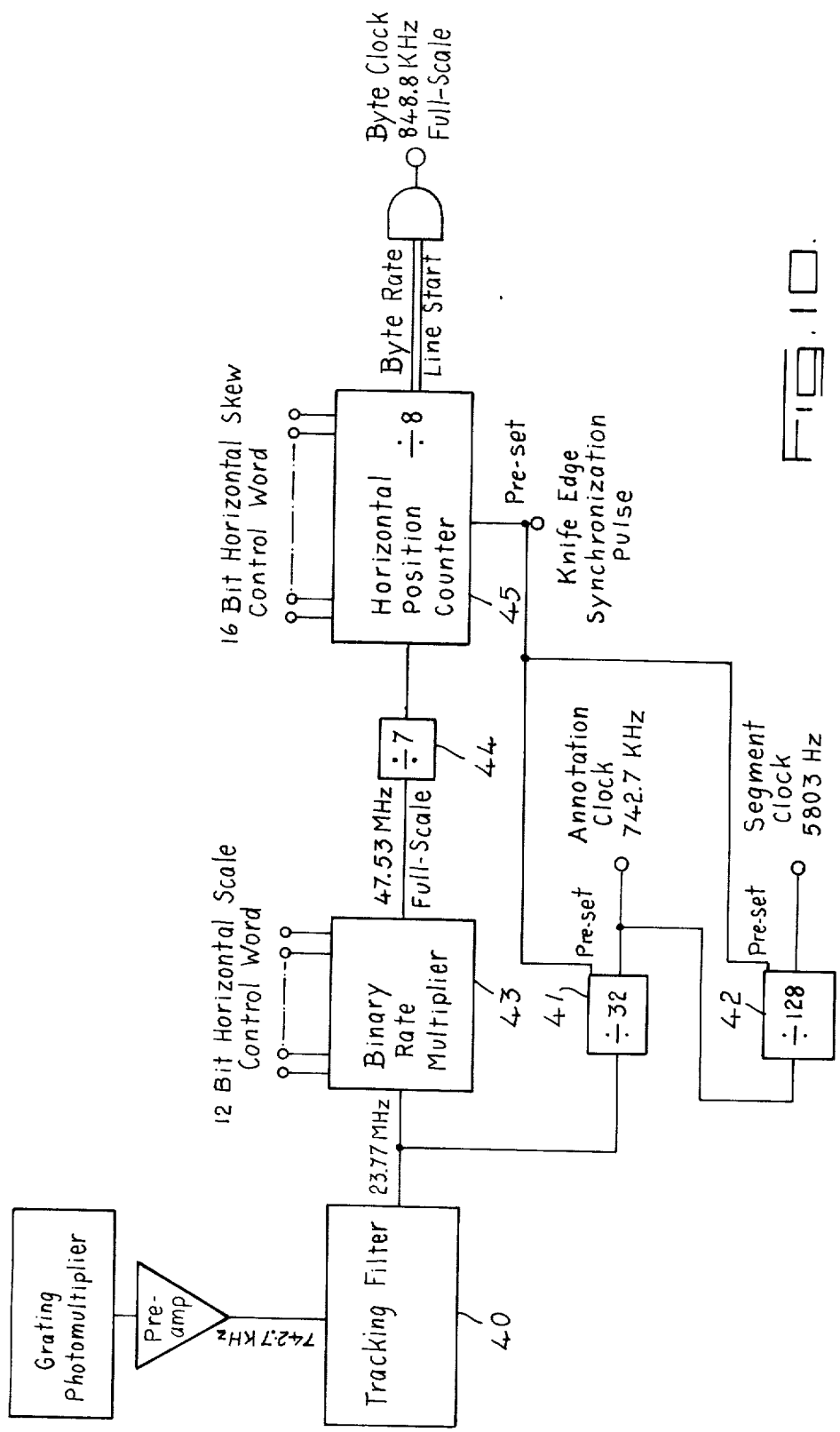

METHOD AND APPARATUS FOR RECORDING LATENT PHOTOGRAPHIC IMAGES

This invention relates to a method of and apparatus for recording latent photographic images on film by scanning the film in a raster pattern with a spot produced by focusing onto the film a beam of radiation which is modulated in accordance with the retrieval of pictorial data defining an image to be recorded. The pictorial data usually comprises a pattern of elemental data each defining a required spot intensity at a respective elemental area of the image to be recorded. In the case of pictorial data obtained from artificial satellites, the pattern of elemental image data may contain a variety of errors representing geometric distortions arising from angular rate errors of the satellite and scan non-linearities; accordingly, the data normally additionally comprises corrective data defining geometric corrections to be made in recording the image.

One object of the present invention is to provide an improved system for recording latent photographic images on film in accordance with the retrieval of data defining an image to be recorded. The method is characterized by the steps of advancing the film longitudinally while traversing the spot across the film cyclically to define successive lines of said raster pattern, producing for each raster line a succession of discrete position signals in synchronism with the traverse of the spot across the film, each signal defining a nominal position element of the respective raster line, deriving from said succession of position signals a succession of discrete clock signals each defining a respective elemental image area, retrieving said elemental data successively in response to the production of said clock signals, and modulating the beam in accordance with the retrieved data so as to set the spot intensity at the required level for each successive element of the image area.

The system has an inherent flexibility which makes it especially suitable for correcting geometric distortions in accordance with corrective data. Stated very broadly, the corrections are made by mechanically varying the positioning of the film in accordance with a first set of said corrective data, whereby to distort the raster pattern in a controlled manner and varying the timing and rate of derivation of the clock signals in relation to the pattern of position signals in accordance with a second set of said corrective data, whereby to set the spot intensity at the required level for each elemental image area as modified by the corrective data.

It will be appreciated that the apparatus of the invention may be used not only in a recording mode, but also in a scanning mode whereby to generate a pattern of data in accordance with the scanning of a prerecorded image or other visual object.

One embodiment of the invention will now be described by way of example with reference to the accompanying drawings, in which:

FIG. 3 is a diagrammatic end view of the apparatus showing essential geometry in a transverse plane;

FIG. 4 is an end elevation of the apparatus;

FIG. 7 is a cross-sectional view in the direction of the arrows 7—7 in FIG. 6;

FIG. 8 is a cross-sectional view in the direction of the arrows 8—8 in FIG. 6;

FIG. 9 is a cross-sectional view of a detail of the film transport assembly;

FIG. 10 is a block diagram of a control system used in making certain geometric corrections in accordance with corrective data;

Figure 1:
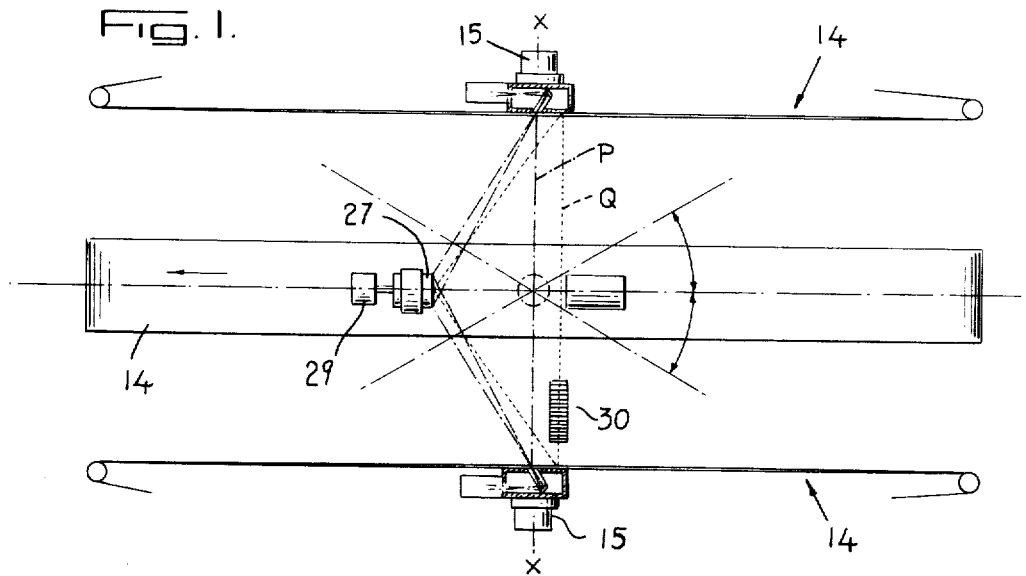
FIG. 1 is a diagrammatic side elevational view, in the direction of the arrow A in FIG. 3, showing essential geometry of the apparatus.
Figure 2:
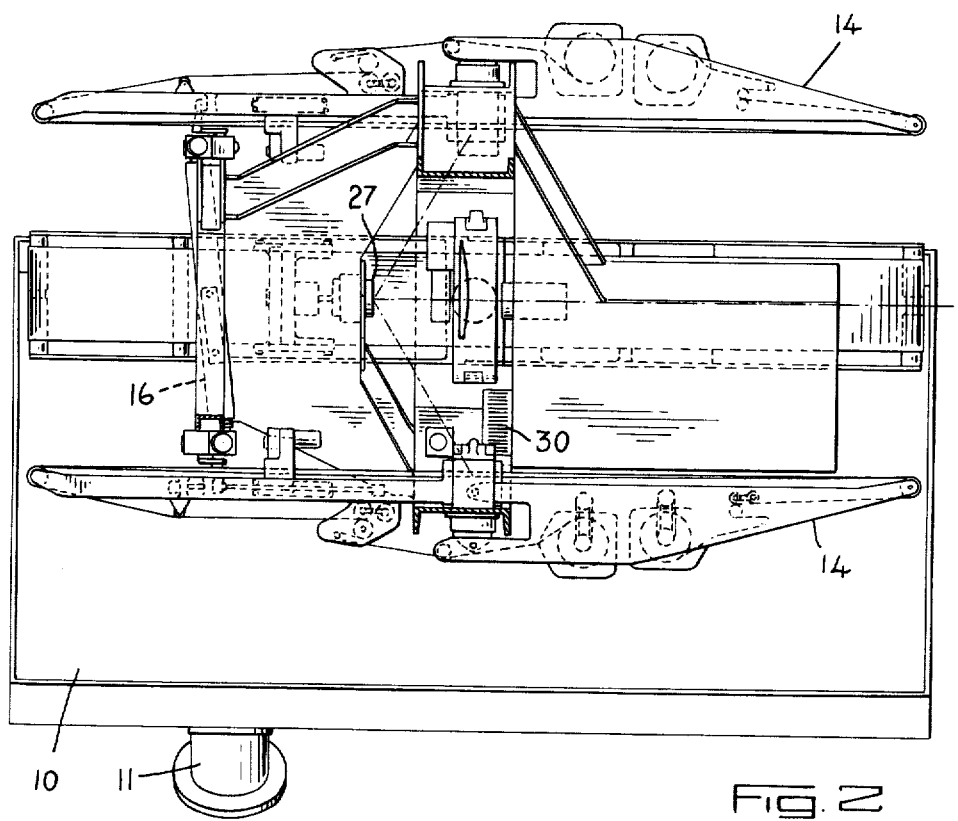
FIG. 2 is a side elevational view, in the direction of the arrow B in FIG. 4, of the apparatus, one film transport being omitted for clarity.
Figure 5:
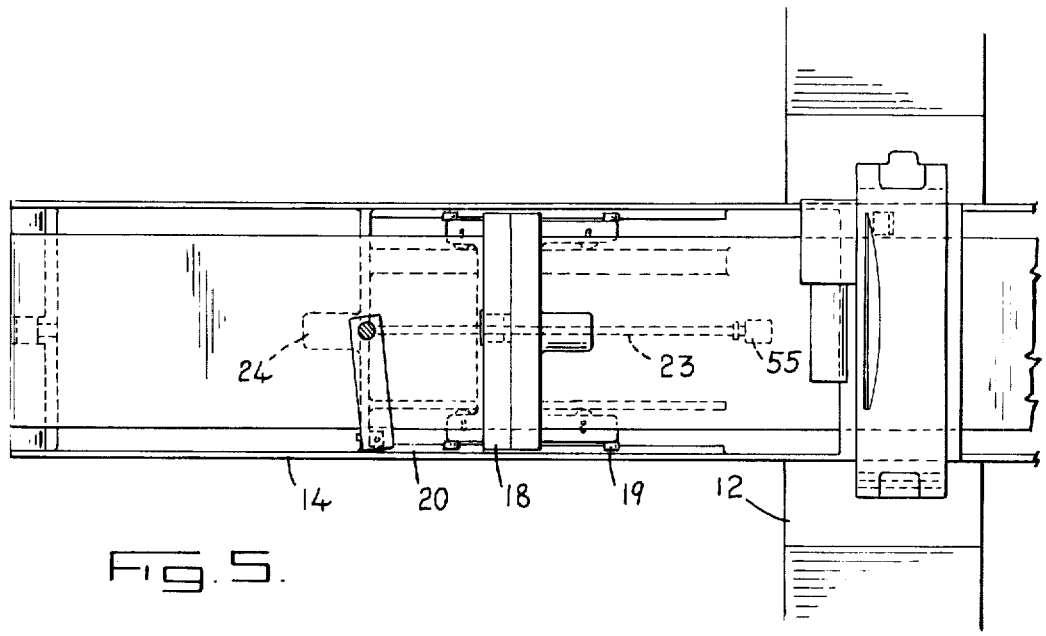
FIG. 5 is a top plan view of a detail of the apparatus.

The mechanical structure of the apparatus will now be described with particular reference to FIGS. 1 to 9.

A main support frame 10 is mounted on three pneumatic vibration isolation pads 11. Rigidly mounted on the support frame 10 is a frame structure consisting of an octagonal frame 12 and an irregular hexagonal frame 13 rigidly connected to it. The octagonal frame 12 supports four longitudinally extending film transports 14 which are symmetrically arranged with respect to the system axis, there being two pairs of diametrically opposed transports. Each film transport 14 is mounted on a universal air bearing 15 which defines a yaw axis (X—X in FIG. 1) about which the transport may be pivotally adjusted within an angular range of ± 15° with respect to the longitudinal axis of the system. The angular adjustment is accomplished by means of a lead screw assembly 16 mounted on the hexagonal frame 13 and operated by a respective electric motor 17 which is servo controlled. (The control system for the motor 17 is illustrated diagrammatically in FIG. 13 and will be described subsequently.)

The film on each film transport 14, suitably tensioned to prevent sagging and misalignment under its own weight, is clamped to a carriage 18 which draws the film over a platen at which writing takes place. The carriage moves along a very accurately aligned track to prevent errors in horizontal positioning, the carriage being fitted with pairs of spring-loaded ball bearing rollers 19 which engage the precision tracks 20. Two other pairs of spring-loaded rollers 21 run along a precision straight edge 22 to maintain accurate lateral positioning of the carriage. The carriage 18 is driven by a precision lead screw 23 driven by a servo motor 24. (The control system for the motor 24 is illustrated diagrammatically in FIG. 12 and will be described subsequently).

As described hereinafter the light spots which traverse the films move along a circular path whose axis is the system axis. To ensure that the spots will remain accurately focused on the films, it is necessary to position the films so as to coincide with the circular path at the position at which writing takes place. As best illustrated in FIG. 9, this is accomplished by providing on each film transport frame a platen 25 having an arcuate surface against which the film is held by suction provided by a vacuum box 26. The amount of suction should be sufficient to hold the film against the platen without introducing excessive sliding friction.

A composite laser beam is directed along the axis of the system and is reflected by a composite mirror 27 which reflects the incident beam along three paths which are angularly spaced at 120° intervals, the reflected beams being focused to form three light spots. The mounting of the mirror 27 comprises an air bearing 28, and the mirror is continuously rotated about the system axis by a servo motor 29 so that the three light spots follow a common circular path which is coincident with the film surfaces. The mirror 27 may be a three-facetted mirror of pyramidal form, each facet reflecting the incident beam in a direction determined by the angular position of the mirror. Alternatively, and in the illustrated embodiment, the mirror 27 incorporates a hologram by which the three light spots are focused, the light spots following the circular path P indicated in FIG. 1. In this case the holographic mirror 27 is arranged to produce a second group of twelve light spots which follow a second circular path Q of the same radius as the path P and coaxial therewith, the second group of light spots traversing an optical grating 30 defining a position reference scale. The discrete position signals in this case are produced photoelectrically in response to modulations of a light spot as it traverses the grating. However, although the drawings illustrate a case of the second kind, it is to be understood that this is simply for the purpose of illustration and that the substitution of a pyramidal mirror for the holographic mirror would not alter the principles of the invention.

The discrete position signals may alternatively be produced by means of an optical shaft angle encoder mechanically driven so as to sense the rotation of the mirror 27. A suitable shaft angle encoder for this purpose is the Baldwin Model 668 Optical Tachometer, which is manufactured by Baldwin Electronics Inc., of Little Rock, Arkansas, U.S.A.

The complete laser beam comprises a "main scene" beam having three primary color components which are intensity modulated by means of a modulator assembly in accordance with image data, and a reference beam. In the case of a system having the geometry of FIG. 1, the main scene beam is focused to form the light spots which follow the circular path P, and the reference beam is focused to form the light spots which follow the circular path Q. The composite beam may also include an annotation beam, used for writing alpha-numeric information for example, the annotation beam being modulated by the modulator assembly in response to data provided by a computer or other data source. If an annotation beam is used, this is focused to form three light spots which follow a circular path positioned between the paths P and Q.

Figure 6:
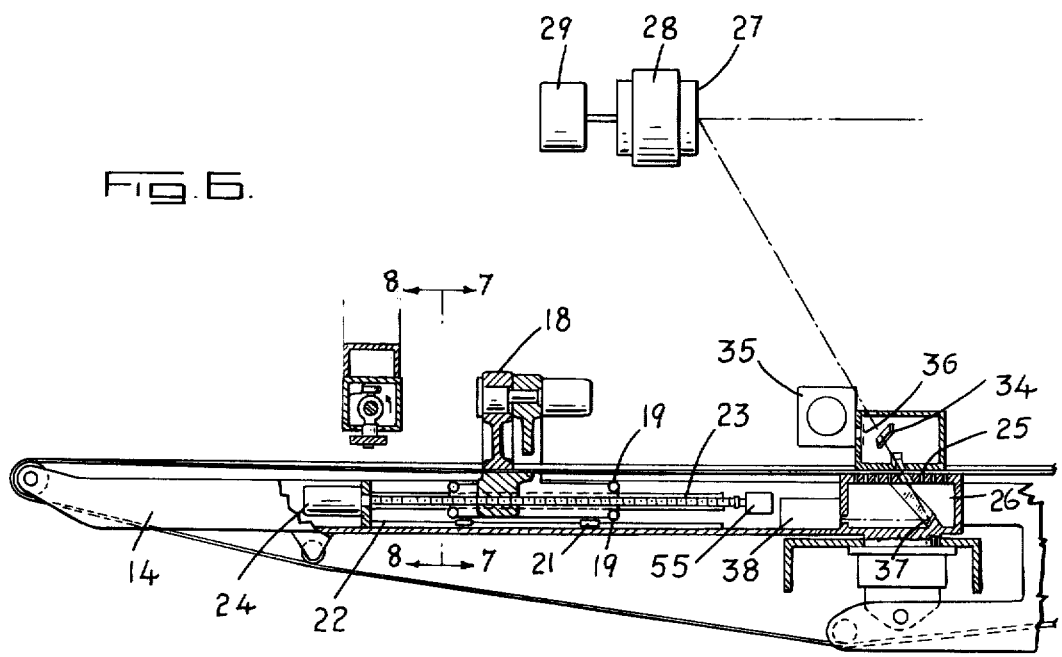
FIG. 6 is a side elevational view of the detail of FIG. 5.

Each film transport has an associated slit-mask and shutter assembly housed in a hinged bridge 31, the bottom of the bridge being curved to conform to the shape of the film. A cast slot allows the light beam to pass through the bottom of the bridge to the film, an additional slot slightly displaced from the first being provided when an annotation beam is used. A slit-mask formed by stainless steel strips forming the slit is fixed to the curved bottom surface of the bridge. The bridge is hinged to a mounting 32 rigidly mounted on the octagonal frame 12 and is releasably latched to a second mounting 33 which is similarly mounted, to permit the bridge to be swung away from the film. In this case where an annotation beam is used, shutters are provided in the assembly, the shutters being independently movable to intercept the main scene beam and the annotation beam, respectively, as required. The assembly also provides a first mirror 34 which intercepts the main scene beam prior to the commencement of a raster line and reflects the beam towards a photomultiplier 35. The reflected beam is intercepted by a knife edge 36 positioned so that, as the beam crosses the knife edge, it falls upon the photomultiplier 35. FIG. 6 also illustrates a second mirror 37 positioned below the film; this mirror serves to intercept light when the apparatus is used in the scanning mode, the light having passed through the film being reflected by the mirror 37 to a photomultiplier 38, i.e., a photodetector or photoelectric cell. The photomultiplier 35 produces a signal in response to the traverse of the light spot across the knife edge 36, which defines a reference position, the signal being processed by a Schmitt trigger circuit (not shown) so as to produce a reference signal.

The apparatus is arranged to be shielded in a light-tight housing, not shown.

It will be observed from the geometry of FIG. 3 that only one of the reflected main scene beams impinges on a respective film at any given instant, and traverses the film as the mirror 27 rotates. As the beam leaves the 30° sector in which it may impinge upon the film, a second one of the reflected beams enters a 30° sector in which it too may impinge upon a second one of the films. Subsequently as the second beam leaves its operative sector, the third beam enters the 30° sector in which it in its turn may impinge upon a third film. Finally, as the third beam leaves its operative sector, the first beam has reached a position from which it enters a 30° sector in which it may impinge upon the fourth film. Thus, the light spots traverse the films in cyclic sequence. Thus the system will operate in response to a complex of image data relating to different images, the different images being recorded on different films independently and concurrently.

Reference will now be made also to FIGS. 10 to 14 in order to describe the system controls and the general mode of operation.

As the mirror 27 rotates the light spots traverse the films in cyclic sequence, the films being advanced longitudinally in relation to the film transports so that, for each film, the traverse of the spot across the film defines successive lines of a raster pattern. The image is recorded by modulating the main scene beam, or rather the primary colour components thereof independently, so that each elemental position of the raster pattern corresponds to a definite beam composition and intensity. The pattern of beam modulation, which is determined electronically in accordance with the retrieval of data, must be correlated very accurately to the raster pattern, which is generated mechanically. This correlation is achieved in the following way.

The timing functions of the system are related to a time scale defined by the rotational speed of the mirror 27, driven by the motor 29, and so that latter does not have to be controlled with extreme precision. As the mirror rotates, the reference beam traverses the grating 30 in synchronism with the traverse of the main scene beam across the film, thereby producing for each raster line a succession of discrete position signals each defining a nominal position element of the respective raster line. These position signals are related to a reference signal produced as the main scene beam traverses the knife edge 36. The reference signal indicates that the main scene beam is at a specific starting position and that the position signals can indicate the traverse of the light spot across the film. If the film and the grating are at the same radius from the system axis, then the timing between two successive position signals corresponds precisely to the movement of the light spot through a distance equal to one grating space. FIG. 10 illustrates how the reference signal and position signals are combined to indicate the traverse position of the light spot relative to the knife edge location in terms of the grating spacings multiplied by a scale factor.

A frequency multiplying tracking filter 40 serves to phase-lock an oscillator to the 32nd harmonic of the grating signal (i.e. the succession of discrete position signals). The output of the tracking filter 40 is a square wave at 23.77 MHz nominal with no amplitude modulation noise; the small amount of frequency modulation and phase modulation deviation, due to the grating errors and harmonic content, will be integrated out to negligible levels by subsequent frequency division operations. The output of the tracking filter 40 is divided by 32 and by 128 by frequency dividers 41, 42 to generate the ANNOTATION CLOCK and SEGMENT CLOCK signals respectively. Since the frequency dividers are preset to a standard starting condition at the knife edge synchronization time, the transitions of these CLOCK signals indicate the true position of the main scene beam in units of one or 128 grating spaces with a maximum jitter of ± 1/32 grating space, due to the random phase of the grating signal at the synchronization time.

To generate a clock, the BYTE CLOCK, for positioning image elements, the tracking filter output is divided in a binary rate multiplier 43 by a factor that can range from ½ to 2048. This variable division permits horizontal scale changes to be made in detail along the raster line. In fact the system is designed to store and implement thirty two different values of horizontal scale in the thirty two segments into which each line is divided. The binary rate multiplier 43 is controlled by a twelve-bit word representing frequency units in straight binary code, and constituting a set of corrective data appertaining to the image to be recorded. A semiconductor random access memory consisting of six 64-bit memory chips will be provided to store the 32 × 12 = 384 bits representing the horizontal scale for each of the thirty two segments of a line. This is loaded from the computer during the synchronization interval preceding each line. The output of the binary rate multiplier 43 is frequency-divided by seven by a divider 44 before entering the horizontal position counter 45. This counter divides the pulse train by a further factor of eight to generate the BYTE CLOCK and can count up to $2^{16}$ eighths of BYTE CLOCK intervals. All sixteen bits of this counter are pre-set at knife-edge synchronization time to a state determined by the "Horizontal Skew word." The BYTE CLOCK signal is gated off until the horizontal position counter 45 reaches the OO.....O state. Thus the Horizontal Skew word determines, in eighth-of-a-pixel-spacing increments, the position of the first pixel in each raster line. The total division by fifty six of the output of the binary rate multiplier is important in that this ratio is large enough to have a substantial smoothing effect on the output rate.

Figure 11:
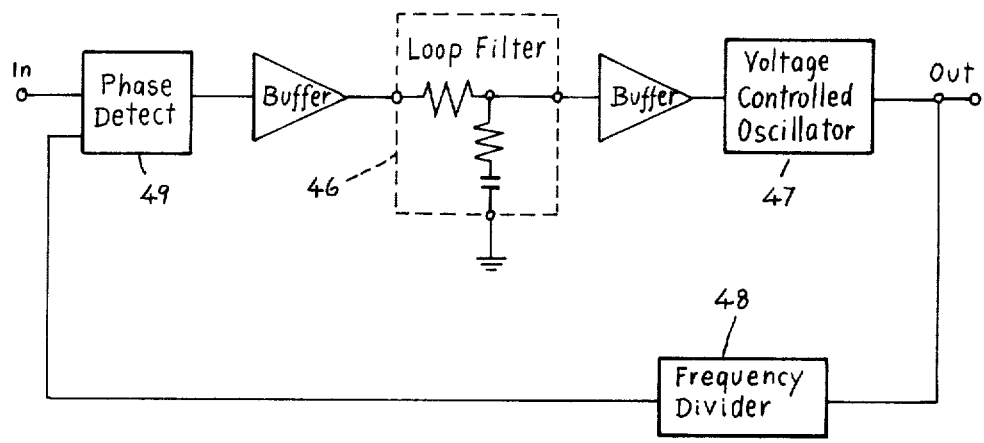
FIG. 11 is a block diagram of a component of the system shown in FIG. 10.

FIG. 11 illustrates the organization of the tracking filter 40 which is used to process the grating signal to produce a clean square wave thirty two times higher in frequency even when the grating has minor flaws. This filter is a second order, type 1 phase-locked loop 46 which controls the frequency and phase of a voltage controlled oscillator 47. The phase of the output of the voltage controlled oscillator 47, after division by thirty two by a frequency divider 48, is compared with the phase of the grating signal by an integrated circuit Modulator/Demodulator 49 used herein in a phase detector mode. The buffered output of this phase detector passes through a passive lead-lag loop filter 46 to control the frequency and phase of the oscillator 47. The values of the loop filter 46 are tailored to give a loop bandwidth as narrow as possible to minimize perturbations from grating flaws but wide enough so that the loop lock-in range will encompass the full range of grating frequencies associated with buffer-loaded signal periods from 70–80 msec, according to data requirements.

Figure 12:
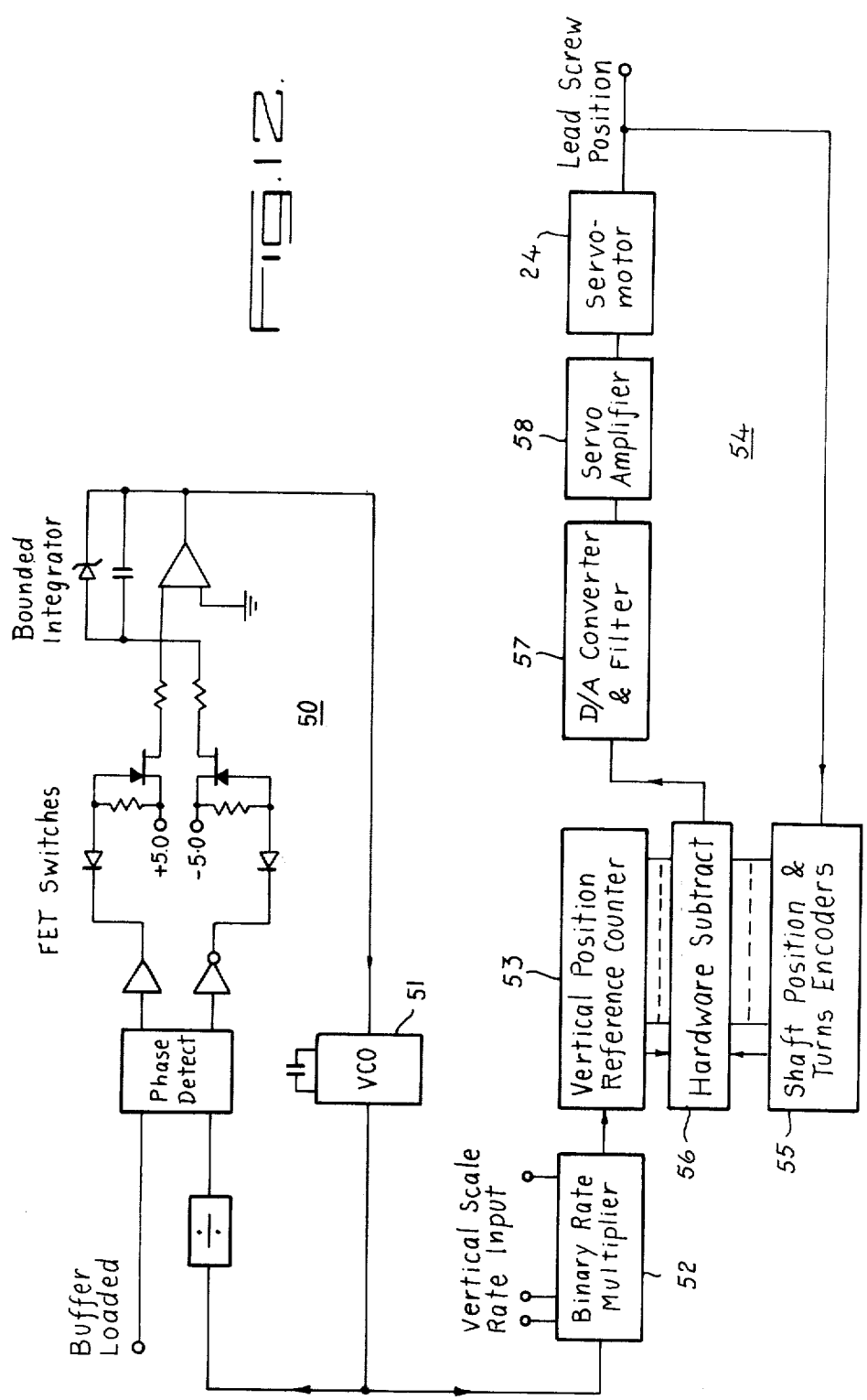
FIG. 12 is a block diagram of a position control system used in making certain other geometric corrections in accordance with corrective data.

The film feed control system must be capable of positioning the carriage 18 very accurately for a wide range of vertical scan rates to accommodate a range of image data from different sources, e.g. artificial satellites and aircraft. Referring to FIG. 12, the system uses a phase-locked loop 50, of the type described by J. L. Brown (Proc. IEEE, April 1971, pp 717-3), to phase-lock a high frequency oscillator 51, which provides the input frequency of a binary rate multiplier 52. The output frequency of the binary rate multiplier 52 is selected by a scale control word, which is a function of another set of corrective data furnished by the computer. The output frequency of the multiplier 52 is counted by a longitudinal position reference counter 53, which provides the reference signal of a closed loop servo system 54. The lead screw 23 (FIG. 6) driven by the servo motor 24, operates a shaft position encoder 55 the signal from which uniquely defines the position of the film carriage 18. A comparator, constituted by substract logic 56, compares this position signal with the reference signal from the reference counter 53; the difference signal is converted to an analogue signal by a digital-analogue converter 57, combined with filter, and is applied to the servo amplifier 58 driving the carriage drive motor 24.

Figure 13:
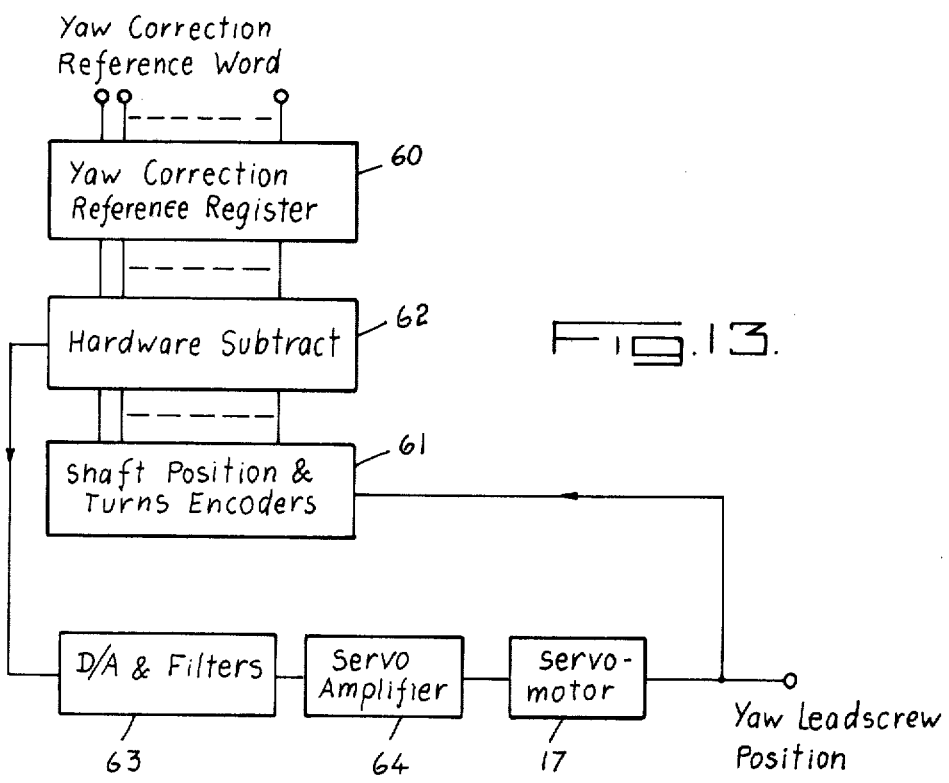
FIG. 13 is a block diagram of another position control system used in making certain other geometric corrections in accordance with corrective data.

FIG. 13 illustrates another position control system varying the angular setting of a film transport in relation to a nominal longitudinal direction. A yaw correction reference word, constituting another set of corrective data furnished by the computer, is applied to a reference register 60 where it is stored. The contents of the register 60 are compared with a feedback signal derived from a shaft position encoder 61, the signal from the latter defining the actual orientation of the film transport as determined by the setting of the lead screw 16 (FIG. 8). The output of the comparator, constituted by subtract logic 62, is converted by a digital-analogue converter 63, the analogue signal from which is applied to the servo amplifier 64 of the motor 17.

Figure 14:
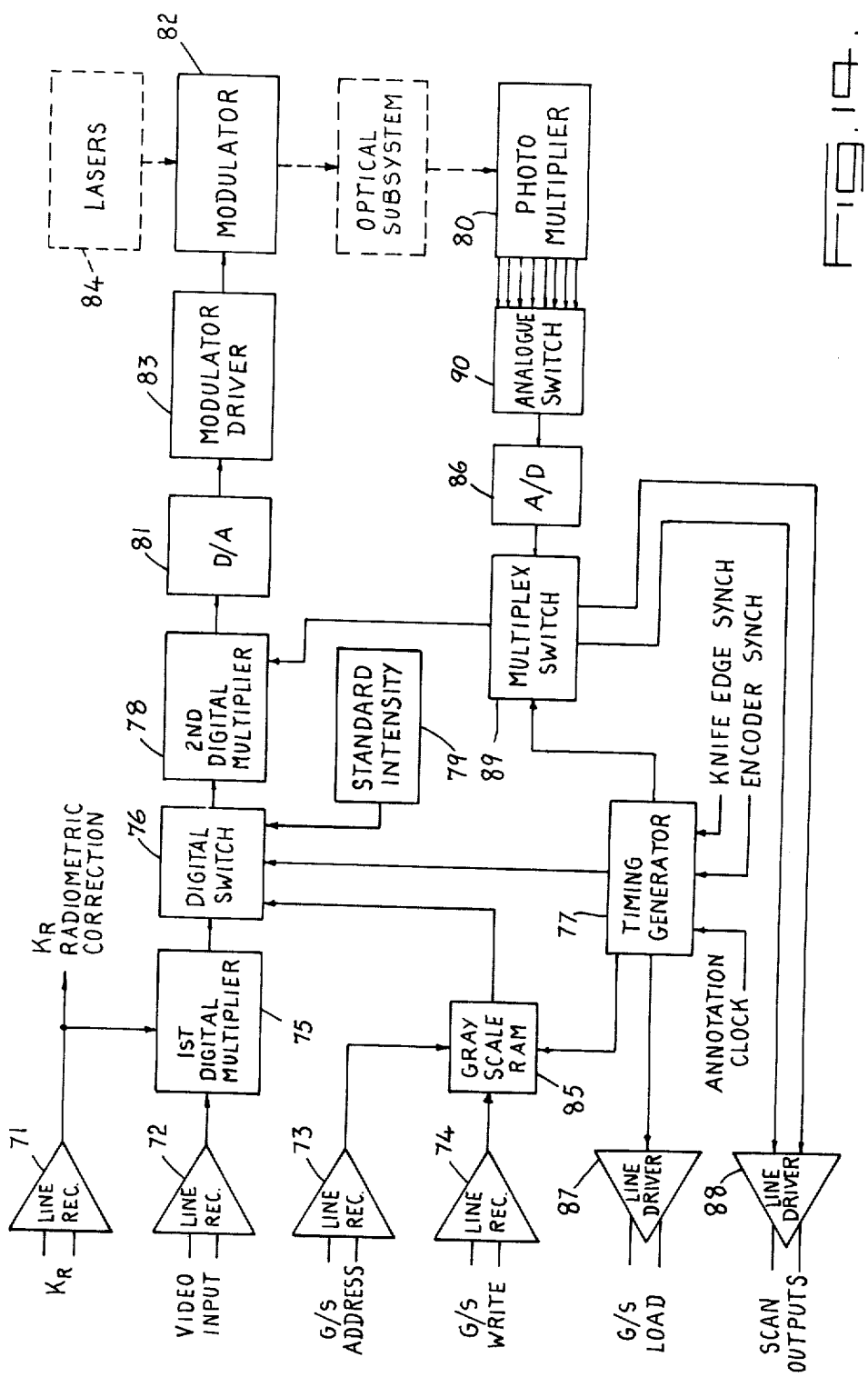
FIG. 14 is a simplified block diagram of the video subsystem.

Four video channels used in the RECORD and SCAN modes are provided in the apparatus. These are denoted as:
Primary No. 1
Primary No. 2
Primary No. 3
Annotation In the RECORD mode, the video information relating to these four channels is received from the data source through the laser beam image recorder computer. The information is processed in the video subsystem. A simplified block diagram of the video subsystem is shown in FIG. 14. As the four channels are basically the same, only one channel is shown together with the functions which are common to all channels.

Reference is made to the simplified block diagram in FIG. 14. In the RECORD mode, the video information for each channel is received in differential digital form. Line receivers 71, 72, 73, 74 convert the information into standard digital form. There are three intensity corrections which are applied to the video. These are:
1. Radiometric Corrections
2. Optical Losses Corrections
3. Modulator Gain Corrections The radiometric correction is recieved in digital form from the data source and is applied to the video through the first high speed digital multiplier 75. The video then goes to a digital switch 76. The digital switch 76 performs several functions:

1. In the image period of the scan line, it allows the normal video to go through to the modulation system.
2. It blanks the video and transmits the gray scale information for gray scale recording.
3. It blanks the video and transmits a standard intensity code for optical losses correction. A standard intensity code is transmitted sequentially through each of the four modulators which all share part of the correction feedback loop.
4. It blanks the video and transmits another standard code to correct the modulator internal gain. Since the loop for this correction is contained within each channel, this particular code is transmitted simultaneously to all channels.
5. It blanks all information to allow each modulator to adjust its bias.
6. In the SCAN mode, it blanks the video in and transmits a standard fixed intensity. A timing generator 77 controls the operation of the digital switch 76. The timing functions will be discussed later in detail.

The video from the digital switch 76 then goes through the second digital multiplier 78. Here the intensity is varied to compensate for optical losses in the system. This is done by multiplying the value of the video by the correction scale factor. The scale factor is determined by applying the standard intensity code 79 through the modulator system, measuring the intensity output at the photomultiplier indicated at 80 but corresponding to the photomultiplier 35 of FIG. 6, and comparing its value to a reference level corresponding to the code. If an error exists, it is used to readjust the value of the correction scale factor. This scale factor is held during the normal video transmission. The digital video is transformed in the digital-analogue converter 81 into an analog voltage which is used to drive the modulator 82 via a driver 83. The modulator 82 varies the intensity of the laser beam 84 which is transmitted through the optical system to expose the film. A sample of light energy is detected at the output of the optical system by the photomultipliers 80 and is used for correction as discussed above.

The gray scale information is stored in a random access memory 85. The memory is loaded from the data source upon command from the computer. The information from the random access memory is retrieved and transmitted to the modulator 82 upon command from the timing generator 77.

In the SCAN mode the output of photomultipliers, also indicated at 80 but actually corresponding to the photomultipliers 38 of FIG. 6, is converted into binary form in a high performance analog to digital converter 86 and is demultiplexed by a switch 89 and transmitted out of the apparatus through line drivers 87, 88.

The timing functions for the video subsystems are generated in the timing generator 77. The timing generator controls the operation of:
a. the digital switch 76;
b. the multiplex switch 89;
c. the analog switch 90;
d. the automatic bias of modulator driver 83. It also addresses the gray scale random access memory 85 for the gray scale recording, and commands the computer to load the random access memory.

To perform these functions the timing generator uses at its inputs: the annotation clock, the synchronization from the mirror encoder and the knife edge synchronizations from the synchronization photomultipliers.

Although the invention has been described with particular reference to a laser beam image recording and scanning system, it is to be understood that such a system represents only one exemplary embodiment of the invention. Instead of a laser beam, a beam of incoherent light or other electromagnetic radiation, polychromatic or monochromatic, may be used in certain applications where a very high spot intensity is not important, and for other applications it may in some cases be advantageous to use an electron beam as will be apparent to those skilled in the art.

What I claim is:

1. A method of recording latent photographic images on film by scanning the film in a raster pattern with a spot produced by focusing onto the film a beam of radiation which is modulated in accordance with the retrieval of pictorial data defining an image to be recorded, the data comprising a plurality of elemental data each defining a required spot intensity at a respective elemental image area and a plurality of sets of corrective data defining geometric distortions of the image to be recorded, which method comprises:

advancing the film longitudinally while traversing the spot across the film cyclically to define successive lines of said raster pattern, producing for each line of the raster pattern a succession of discrete position signals in synchronism with the traverse of the spot across the film, each position signal defining a respective nominal position element of the respective raster line, deriving from said succession of position signals a succession of discrete clock signals each defining a respective elemental image area, retrieving said elemental data successively in response to the derivation of said clock signals, varying the rate of derivation of said clock signals in relation to the production of said position signals in accordance with a first set of said corrective data, varying the rate of film advance in accordance with a second set of said corrective data, varying the direction of film advance in relation to a nominal longitudinal direction in accordance with a third set of said corrective data, and modulating the beam in accordance with the retrieved data so as to set the spot intensity at the required level for each successive elemental image area as corrected by said corrective data.

2. A method according to claim 1, in which the discrete position signals are produced in accordance with the traverse of a second light across a stationary grating in synchronism with the transverse of the first mentioned spot across the film, said discrete position signals being produced photoelectrically in response to modulations of the second spot as it traverses the grating.

3. A method of recording latent photographic images on film by scanning the film in a raster pattern with a spot produced by focusing onto the film a beam of radiation which is modulated in accordance with the retrieval of pictorial data defining an image to be recorded, the data comprising a plurality of elemental data each defining a required spot intensity at a respective elemental image area, and additionally comprising corrective data defining geometrical distortions of the image to be recorded, which method comprises:
- advancing the film longitudinally while traversing the spot across the film cyclically to define successive lines of said raster pattern,
- mechanically varying the positioning of the film in accordance with a first set of said corrective data, whereby to distort the raster pattern in a controlled manner,
- producing for each raster line a succession of discrete position signals in synchronism with the traverse of the spot across the film, each signal defining a nominal position element of the respective raster line,
- deriving from said succession of position signals a succession of discrete clock signals each defining a respective elemental image area,
- varying the derivation of said clock signals in relation to the production of the position signals in accordance with a second set of said corrective data,
- retrieving said elemental data successively in response to the production of said clock signals, and
- modulating the beam in accordance with the retrieved data so as to set the spot intensity at the required level for each successive element of the image area.

4. A method according to claim 3, wherein the beam of radiation is a laser beam.

5. A method of recording latent photographic images on film by scanning the film in a raster pattern with a spot produced by focusing a laser beam which is modulated in accordance with the retrieval of pictorial data defining an image to be recorded, the data comprising a plurality of elemental data each defining a required spot intensity at a respective elemental image area and a plurality of sets of corrective data defining geometric distortions of the image to be recorded, which method comprises:
- advancing the film longitudinally while traversing the spot across the film cyclically to define successive lines of said raster pattern,
- producing for each line of the raster pattern a succession of discrete position signals in synchronism with the traverse of the spot across the film, each position signal defining a respective nominal position element of the respective raster line, deriving from said succession of position signals a succession of discrete clock signals each defining a respective elemental image area,
- retrieving said elemental data successively in response to the derivation of said clock signals,
- varying the rate of derivation of said clock signals in relation to the production of said position signals in accordance with a first set of said corrective data,
- varying the rate of film advance in accordance with a second set of said corrective data,
- varying the direction of film advance in relation to a nominal longitudinal direction in accordance with a third set of said corrective data, and
- modulating the beam in accordance with the retrieved data so as to set the spot intensity at the required level for each successive elemental image area as corrected by said corrective data.

6. A method according to claim 5, in which the laser beam has a plurality of primary color components, each component, of the beam being modulated in accordance with the retrieval of stored data defining the respective color component of the image to be recorded.

7. Apparatus for recording latent photographic images on film by scanning the film in a raster pattern with a spot produced by focusing a laser beam which is modulated in accordance with the retrieval of pictorial data defining an image to be recorded, the data comprising a plurality of elemental data each defining a required spot intensity at a respective elemental image area and a plurality of corrective data defining geometric distortions of the image to be recorded, the apparatus comprising:
- a film transport including
- means for advancing the film longitudinally,
- an optical system for focusing the laser beam onto the film to define a first spot, the optical system including means for traversing the spot across the film cyclically to define successive lines of said raster pattern,
- means responsive to the traverse of the spot across the film for producing a succession of discrete position signals each defining a respective nominal position element of a respective raster line,
- means responsive to the production of said position signals and a first set of said corrective data for producing a succession of clock signals each defining a respective elemental image area,
- means responsive to a second set of said corrective data for varying the positioning of the film whereby to distort the raster pattern in a controlled manner,
- means responsive to the production of said clock signals for retrieving said elemental data, and
- modulating means for modulating the laser beam in accordance with the retrieved data so as to set the spot intensity at the required level for each successive element of the image area.

8. Apparatus according to claim 7, wherein said means for producing a succession of discrete position signals comprises a stationary grating, means for traversing a second spot across the grating in synchronism with the traverse of the first mentioned spot across the film, and photoelectric means responsive to modulations of the second spot for producing said position signals.

9. Apparatus according to claim 7, including a stationary optical grating, means for traversing a second spot across the grating in synchronism with the traverse of the first spot across the film, and photoelectric means responsive to modulations of the second light spot for producing said position signals.

10. Apparatus for recording latent photographic images on film by scanning the film in a raster pattern with a light spot produced by focusing a laser beam which is modulated in accordance with the retrieval of pictorial data defining an image to be recorded, the data comprising a plurality of elemental data each defining a required spot intensity at a respective elemental image area and a plurality of said corrective data defining geometric distortions of the image to be recorded, the apparatus comprising:

a. a film transport including means for advancing the film longitudinally, b. an optical system including
   i. means for focusing the laser beam onto the film to define a first light spot,
   ii. means for traversing the first light spot across the film cyclically to define successive lines of the raster pattern.

c. means responsive to the traverse of the light spot across the film to produce in synchronism therewith a succession of discrete position signals each defining a respective nominal position element of a respective raster line, d. means responsive to the production of said discrete position signals for producing a succession of clock signals each defining a respective elemental image area, said clock signal producing means comprising:
   i. means responsive to the production of said position signals and a first set of said corrective data for producing a binary signal train,
   ii, a counter responsive to said binary signal train and a second set of said corrective data for producing a succession of clock signals each defining a corrected position element of a respective raster line, and
   iii. means responsive to the traverse of the first light spot past a reference position in each cycle for resetting the counter, e. servo means responsive to a third set of said corrective data for varying the rate of film advance, f. servo means responsive to a fourth set of said corrective data for varying the orientation of the film transport in relation to a nominal longitudinal direction, g. means responsive to the production of said position signals for retrieving said elemental data, and h. modulating means for modulating the laser beam in accordance with the retrieved data so as to set the spot intensity of the required level for each successive element of the image area.

11. Apparatus according to claim 10, comprising a plurality of film transports, the optical system including means for focusing the laser beam to define a plurality of light spots, and means for traversing the light spots in cyclic sequence across the films mounted on the respective transports to define successive lines of the raster pattern for each film, the film transports being positioned so that only one of said light spots traverses the respective film at any one time, the images to be recorded on different films being recorded independently and concurrently.

* * * * *